2,764,147

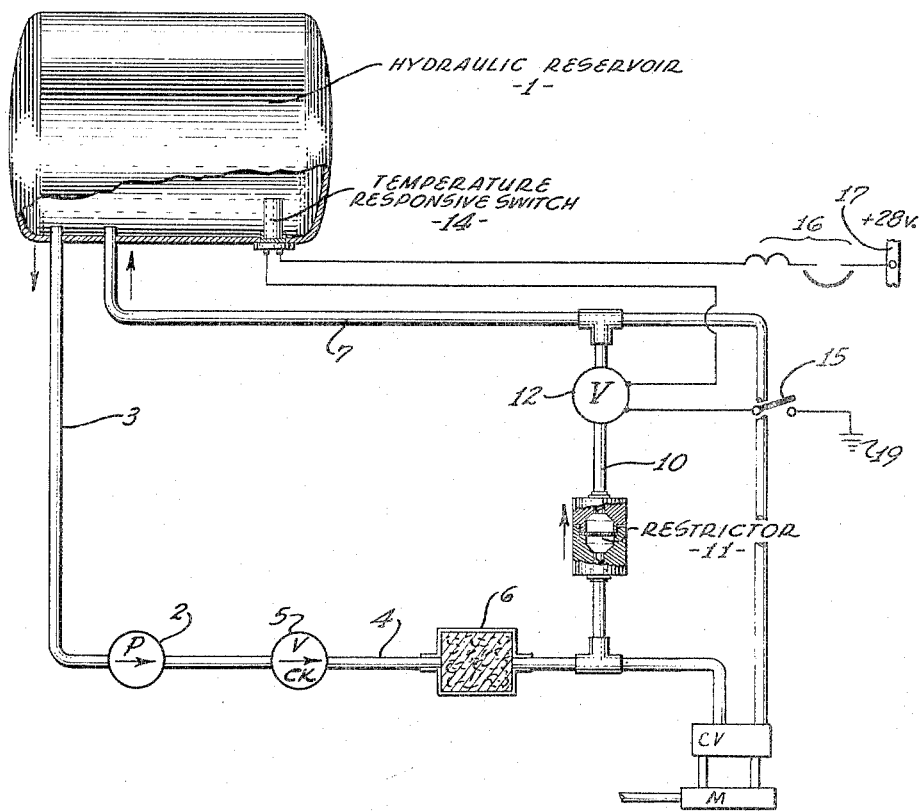

FRICTIONAL HEATER FOR HYDRAULIC SYSTEM

Paul F. Brunner, Hawthorne, Calif., assignor to Northrop Aircraft, Inc., Hawthorne, Calif., a corporation of California Application February 23, 1951, Serial No. 212,235

6 Claims. (Cl. 126—247)

This invention relates to fluid control systems, and, more particularly, to a simple heating system for heating the fluid in an aircraft hydraulic system or the like.

When the temperature of hydraulic fluid is lowered below approximately −30° F., it does not flow satisfactorily in hydraulically operated equipment. When based in extremely cold regions reaching as low as −65° F., for example, aircraft hydraulic systems are inoperable until the contained fluid is heated. Electrical heating systems have been tried, but are not practical insofar as space, weight and efficiency are concerned.

It is an object of the present invention to provide a simple hydraulic heater system, especially adapted for aircraft.

Briefly, my invention comprises a hydraulic system bypass line containing a restrictor and a normally closed valve. When the regular hydraulic pump is operated, and the valve opened, fluid is heated solely by being pumped through the restrictor.

The invention may be more fully understood by reference to the ensuing description of specific apparatus and the accompanying drawing, which shows in schematic form the invention connected in a hydraulic system.

Referring to the drawing, a hydraulic reservoir 1 in an airplane, for example, is connected to the inlet of an engine-driven hydraulic pump 2 by a pump supply line 3. The outlet of the pump 2 is connected to a pressure line 4 containing the usual check valve 5 and filter 6, before leading to the various hydraulic components to be operated, such as the hydraulic motor M operated by a control valve CV. A return line 7 carries fluid from these components back to the reservoir 1.

A bypass line 10 is installed between the pressure line 4 and return line 7, this line containing a restrictor 11, which is preferably an orificed thin plate, and a normally closed shut-off valve 12. When the aircraft engine is started, the engine-driven pump 2 is in operation, and when the shut-off valve 12 is open, fluid is being forced through the restrictor 11 and heated thereby. The portion of return line 7 between the reservoir 1 and the bypass line 10 is made as short as possible to minimize heat losses through the line.

Very successful heating of the reservoir fluid is accomplished by this invention. For example, using a pump pressure of 3,000 p. s. i. (the same as used in the regular hydraulic system), and an orifice diameter of .052 inch, three gallons of reservoir hydraulic fluid has been heated in practice from −65° F. to −10° F. in 2.75 minutes. If this heating were to be done by an electrical blanket type heater around the reservoir, or by an electrical immersion type heater, the power required would be 3715 watts.

The control of the heater system of the present invention is preferably automatic, and to this end, an electrically operated valve is used, together with a temperature-responsive switch 14 mounted in the bottom of the reservoir 1. Another feature is a cut-out switch 15 mounted on one of the aircraft's landing gear struts (not shown), this switch being closed when the aircraft is standing on the ground. This type of switch mounting is well known in the art, for operation of landing gear indicators and other control circuits, and will not be described in detail herein. The shut-off valve 12, temperature-responsive switch 14, and cutout switch 15 are all wired in series with the normal electrical power supply of the aircraft, such as illustrated by a circuit breaker 16 connected to a 28-volt bus bar 17, and a grounded connection 19.

The temperature switch 14 is set to open, on rising temperature, at approximately +5° F. Therefore, whenever the airplane's electrical power is turned on, at a lower temperature, and the pump 2 is operating, the shut-off valve 12 will be opened to start the heating system. If the airplane is taken off before the temperature-responsive switch 14 has opened, the cut-out switch 15 on the landing gear will open to allow de-energizing and closing of the shut-off valve 12 and thus retain the full pump flow capacity available for normal use in flying the airplane.

It is thus seen that a very simple, compact, and efficient heater is provided by the present invention. The only parts required over and above the existing hydraulic system components are the small restrictor and the shut-off valve which may be any type valve desired. Of course, fluid is heated only in the circuit comprising the reservoir, pump supply line, short section of pressure line, bypass line, and short section of return line. However, as soon as any hydraulic cylinders or other components of the system are moved, heated fluid is pumped directly to them, and cold fluid returning from the system becomes heated in the reservoir. Thus, in the normal checking out of hydraulically operated flight control surfaces, for example, the fluid contained in the entire system is easily heated.

This heater system is obviously useful in fuel or oil systems, or the like, in any industry, and is not, therefore, limited to use in combination with an aircraft hydraulic system.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In a fluid power system, the combination of a reservoir for holding a quantity of fluid for said system, a fluid pump connected to pump fluid from said reservoir to the remainder of said system, a fluid return line from said system to said reservoir, a heat-producing restrictor and a shut-off valve connected in series, said series combination being connected directly from the outlet side of said pump to said return line, whereby said fluid can be rapidly heated by pumping through said restrictor, and fluid temperature-responsive control means operatively connected to said shut-off valve to open and close said valve below and above, respectively, a desired heat control temperature of fluid in said reservoir.

2. In an aircraft hydraulic system having a fluid supply reservoir and an engine-driven fluid pump connected to be supplied with fluid from said reservoir for powering hydraulically operated actuating components, fluid heating means for raising extremely cold fluid to operating temperature, comprising a fluid line connected directly from the outlet side of said pump to said reservoir, said fluid line containing restrictor means and a shut-off valve in series, said shut-off valve being a normally closed electrically operated valve, and including a temperature-responsive switch located in said reservoir, said valve and said switch being wired in series with a source of electrical power.

3. In a hydraulic system for actuating power mechanisms and having a reservoir and a fluid pump for withdrawing fluid from the reservoir and supplying fluid to the system under a pressure of the order of 3000 p. s. i., the combination of a heater system to raise cold fluid to operating temperature for the power mechanisms, said system comprising a single heat-producing restrictor and a shut-off valve connected in series between the outlet side of the pump and the reservoir, said restrictor comprising a thin plate provided with a single orifice having a diameter of the order of .052 inch through which all restrictor flow must pass, and means connected to said valve for opening and closing the latter to render said heater system operative or inoperative, said heater system being otherwise substantially unrestricted to flow.

4. In an aircraft hydraulic system having a fluid supply reservoir and an engine-driven fluid pump connected to be supplied with fluid from the reservoir for powering hydraulically operated actuating components with fluid pressure of the order of 3000 p. s. i., the combination of heating means for raising extremely cold fluid to operating temperature comprising: a fluid line connected from the outlet side of the pump to the reservoir, said line containing a single heat-producing restrictor means and a shut-off valve in series, said restrictor means comprising a thin plate provided with a single orifice having a diameter of the order of .052 inch through which all restrictor flow must pass, said line being otherwise substantially unrestricted to flow, and said valve being operable to render said heating means operative or inoperative.

5. In a hydraulic system for actuating power mechanisms, the combination of means for heating a liquid in a reservoir in the system having an inlet and an outlet, comprising a system powering pump connected to withdraw liquid from said reservoir outlet and to supply liquid to the system under a pressure of the order of 3000 p. s. i., conduit means for returning liquid leaving said pump to said reservoir inlet, said conduit means including a single restrictor comprising a thin plate filling the flow section of said restrictor and having a single flow restricting orifice therein having a diameter of the order of .052 inch for creating a pressure drop in, and a heating of, said liquid before return to said reservoir, the flow through said conduit means being otherwise substantially unrestricted.

6. Apparatus in accordance with claim 3 wherein said shut-off valve is a normally closed electrically operated valve, and including a temperature-sensitive switch positioned in said reservoir to attain the same temperature as fluid therein, said valve and said switch being wired in series to control opening and closing of said valve, and said switch arranged to be open at a temperature above the lowest safe operating temperature of the fluid in said control system.

References Cited in the file of this patent

UNITED STATES PATENTS

| 1,031,489 | Thomson | July 2, 1912 |
| 1,334,280 | Constantinesco | Mar. 23, 1920 |
| 1,534,091 | Smoot | Apr. 21, 1925 |
| 1,758,207 | Walker | May 13, 1930 |
| 1,891,357 | Peltier | Dec. 20, 1932 |
| 2,009,137 | Kleckner | July 23, 1935 |
| 2,107,933 | Crockett et al. | Feb. 8, 1938 |
| 2,231,764 | Laing | Feb. 11, 1941 |
| 2,399,783 | Beavan | May 9, 1946 |
| 2,650,003 | Coleman | Aug. 25, 1953 |

FOREIGN PATENTS

| 83,266 | Switzerland | May 1, 1920 |